United States Patent [19]
Hooper

[11] 3,783,961
[45] Jan. 8, 1974

[54] LOOP DRIVEN VEHICLES

[75] Inventor: Bernard Hooper, Wordsley near Stourbridge, England

[73] Assignee: Norton Villiers Limited, Wolverhampton, England

[22] Filed: July 2, 1971

[21] Appl. No.: 159,448

[30] Foreign Application Priority Data
July 7, 1970    Great Britain.............. 32803/70

[52] U.S. Cl.................. 180/33 A, 180/64 R, 248/3
[51] Int. Cl............................................. B60k 5/12
[58] Field of Search.................. 180/33 R, 33 A, 30, 180/31, 32; 280/281

[56] References Cited
UNITED STATES PATENTS

| | | | |
|---|---|---|---|
| 3,542,146 | 11/1970 | Hooper et al. | 180/64 R |
| 3,508,765 | 4/1970 | Bauer et al. | 280/281 |
| 3,233,916 | 2/1966 | Bowden | 280/281 X |
| 2,770,311 | 11/1956 | Kreidler | 180/33 R |
| 2,743,783 | 5/1956 | Kreidler | 180/33 R |

FOREIGN PATENTS OR APPLICATIONS

| | | | |
|---|---|---|---|
| 941,111 | 3/1956 | Germany | 180/33 A |
| 487,682 | 6/1938 | Great Britain | 180/33 R |
| 9,877 | 2/1915 | Great Britain | 180/33 R |

Primary Examiner—Kenneth H. Betts
Assistant Examiner—John P. Silverstrim
Attorney—Kurt Kelman

[57] ABSTRACT

The specification discloses a motor cycle in which a power unit is mounted in a frame on resilient mountings and the rear road wheel is mounted in a fork swinging on the power unit and connected to springing means. There are two mounting means and a lateral locating means between the power unit and the frame, such mountings being at the apices of a triangle lying in a plane perpendicular to the rotary axis of the rear road wheel. The mounting means are resilient and the means together, are such as to allow a greater amplitude of movement in directions radial of said rotary axis than in directions parallel to said rotary axis and the movement of the power unit relative to the frame at each of said means is positively controlled in directions parallel to said axis. The specification also discloses that the mountings are located on parts of the frame which are rigidly interconnected with a link from one of the mountings to the power unit. The frame may be of sheet metal construction.

12 Claims, 6 Drawing Figures

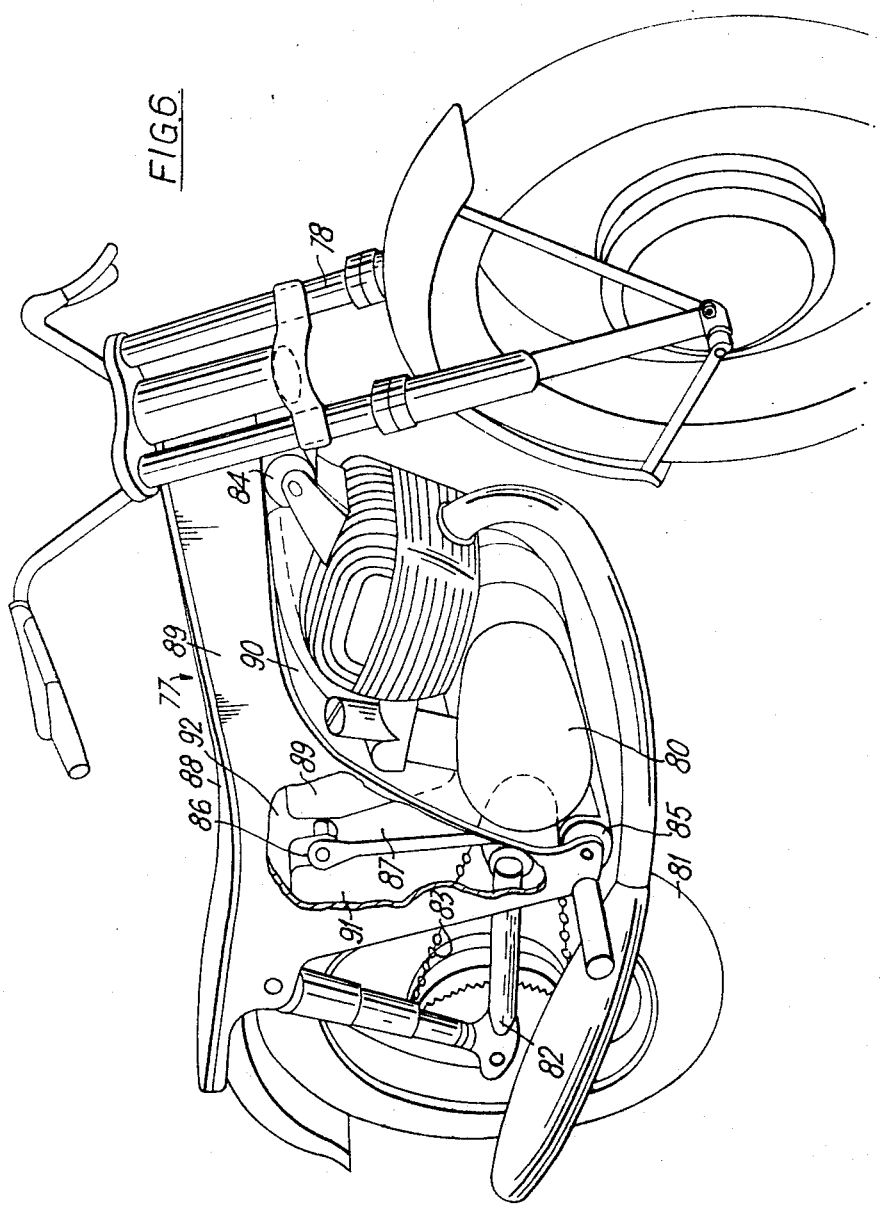

LOOP DRIVEN VEHICLES

BACKGROUND OF THE INVENTION

1. Field of the Invention

The invention is concerned with vehicles which are driven by a flexible loop, particularly a chain, and the invention is applicable to motor cycles including all steerable two wheeled power driven vehicles, and also to snowmobiles.

2. Description of the Prior Art

In U.S. Pat. No. 3,542,146 which issued on the 24th Nov. 1970 on the application of Bernard Hooper and Robert Victor Trigg there is described a motor cycle construction in which the power unit is mounted on the frame by three resilient mountings at the apices of a triangle lying in a plane perpendicular to the rotary axis of the driven road wheel.

In said patent we described how two of the resilient mountings each included a shaft secured to the frame or the power unit and a tubular assembly secured to the power unit or the frame and a mass of resilient material between the shaft and the tubular assembly, the shaft and the tubular assembly carrying abutments which through anti-friction washers limited positively the movement of the power unit relative to the frame in directions parallel to the said axis.

We disclosed how between the cylinder head and the frame there was a mounting comprising resilient discs in compression in a direction perpendicular to their faces which were perpendicular to the rotary axis of the road wheel.

We have found that the suspension described in said patent is a considerable improvement over the prior art and locates the power unit relative to the frame in a manner which is entirely suitable for high speed touring motor cycles.

We have found surprisingly, however, that where one is dealing with extremely high performance racing motor cycles the performance of the motor cycle can be significantly increased by arranging each of the mountings so that there is a positive limitation on the movement of the power unit relative to the frame in directions parallel to the rotary axis of the road wheel.

When a racing motor cycle is cornering, the forces between the power unit and the frame are very considerable and we have found that while movement of the power unit relative to the frame in directions perpendicular to the rotary axis of the road wheel are acceptable, movement of the power unit relative to the frame in directions parallel to said axis must be positively controlled in extremely high performance racing motor cycles.

SUMMARY OF THE INVENTION

It is an object of the invention to provide a vehicle driven by a flexible loop, particularly but not exclusively a chain, in which the power unit is mounted in the frame in such a manner that forces tending to displace the power unit in directions parallel to the rotary axis of the driven wheel are positively controlled.

It is another object of the invention to provide in a motor cycle the combination of a power unit, a frame, and mountings between the power unit and the frame which can withstand the extremly high forces which occur in very high speed racing motor cycles and can therefore significantly increase the speed of such motor cycles over a winding course, i.e., can decrease the time taken to circuit a winding course.

According to the invention we provide a vehicle comprising a frame; a power unit movably mounted on the frame but having a neutral position relative thereto; a fork pivotally mounted on the power unit; a driving wheel rotatably mounted in the fork; a driving loop interconnecting the driving wheel and the power unit; and three mountings between the power unit and the frame; the mountings being located respectively at the apices of a triangle lying in a plane perpendicular to the axis of rotation of the driving wheel, each of the mountings comprising a first rigid mounting element fixed to one of the power units and the frame, a second rigid mounting element fixed to the other of the power units and the frame, each element providing two oppositely directed faces, the faces of the elements of each mounting being arranged in two pairs, each pair comprising one face from each element with the faces of each pair facing one another, and a thrust member of bearing material interposed between each pair of faces; each of at least two of the mountings including a mass of resilient material interposed between the elements; the mountings controlling movement of the power unit relative to the frame so that the permitted amplitude of such movement in first directions radial to the axis is controlled by deformation of the resilient material and is a number of times greater than the permitted amplitude of such movement in second directions parallel to said axis which latter amplitude is controlled by said bearing material.

BRIEF DESCRIPTION OF THE DRAWINGS.

The invention will now be described in detail by way of example with reference to the accompanying drawings in which:

FIG. 6 is a perspective view of a motor cycle constituting a second embodiment of the invention.

DESCRIPTION OF THE PREFERRED EMBODIMENT

Figure 1:
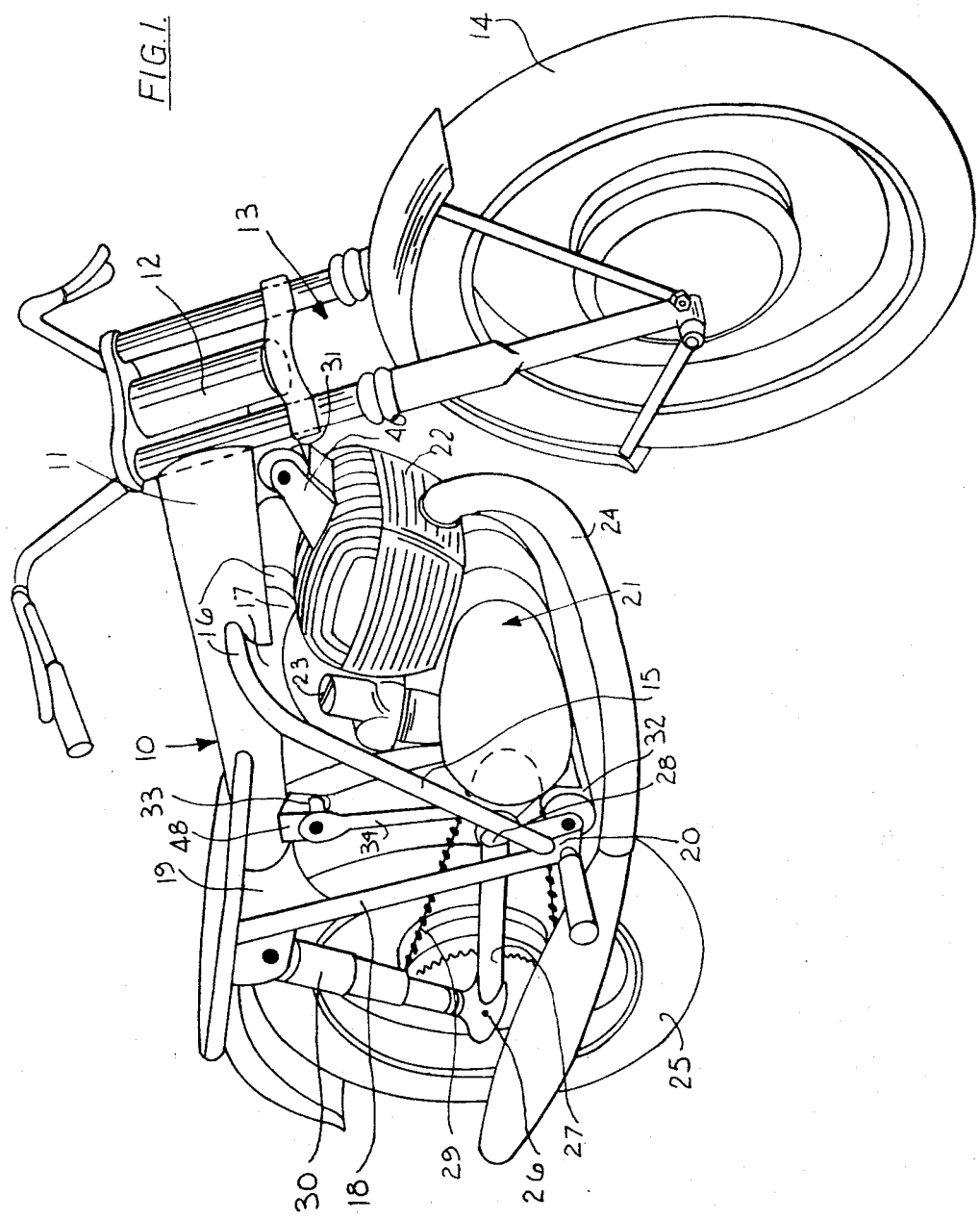
FIG. 1 is a perspective view of a motor cycle constuting a first embodiment of the invention.

Referring now to FIG. 1 this shows a motor cycle having a frame indicated generally at 10. The frame is in many respects similar to that described in U.S. Pat. No. 3,508,765 issued the 28th Apr. 1970 on the application of Stefan George Bauer, Bernard Hooper and Robert Victor Trigg. The main difference between the frame shown in FIG. 1 and that described in the above mentioned U.S. Pat. No. 3,508,765 is that in the former the tubes which were provided in the previous arrangement to support the engine have been dispensed with and the engine is supported solely from the rigid, triangulated frame.

It has been common in the past to have bent tubes in a tubular motor cycle frame and to have a least one of the power unit mountings supported from said bent tubes as described in said patent. We have found, however, that such bent tubes tend to deflect under extreme loads and as a result there can be a disadvantageous effect on the motor cycle handling, particularly where the swinging fork which carries the rear road wheel is pivotally mounted on the power unit. The power unit may twist about a vertical axis and thus allow the driven wheel to twist about said axis thus affecting handling characteristics. As will be described in detail below, the power unit of the present invention is preferably mounted directly from the rigid part of the frame and thus not rely for its location on any bent tubes.

The frame shown in FIG. 1 comprises a backbone 11 having a support 12 at its front end which pivotally supports the front fork 13 in which is mounted the front road wheel 14. Secured to the backbone 11 approximately half way along the backbone are two straight tubes 15 which at their upper ends are rigidly secured to the backbone through bent portions 16 and gussets 17. The bent portions 16 and gussets 17 form transversely extending rigid attachment means for the tubes 15 and project on both sides of the backbone 11. It will be seen that the tubes are straight up to the gussets 17 and are thus rigidly connected to the backbone 11 and cannot move relative thereto.

There is a second pair of tubes at the rear end of the backbone of which one tube 18 is shown and is gusseted at its upper end at 19 to the backbone and is thus rigidly secured to the backbone. The gussets 19 form transversely extending rigid attachment means for the tubes 18 and project on both sides of the backbone 11. On each side of the frame, the tubes 15 and 18 are joined at a junction 20. It will be appreciated, therefore, that the backbone 11 and the tubes 15 and 18 form a rigid triangulated structure from which the power unit may be supported and that there is no danger of this frame unit deflecting under extreme load because of its triangulated construction. Further details of the precise construction of the frame can be obtained from said U.S. Pat. No. 3,508,765.

A power unit for the motor cycle is indicated generally at 21 and in the example shown comprises a unitary engine and gearbox, the engine having a cylinder block 22 carrying a carburettor 23 and an exhaust pipe 24. The rear road or driving wheel is indicated at 25 and is rotatably mounted about an axis 26 in a fork 27 which is pivotally mounted at 28 to the power unit 21. The wheel 25 is drivingly connected with a power unit through a chain 29 but this chain could be replaced by some other form of driving loop such as an internally toothed belt. Conventional springing means 30 are interposed between the fork 27 and the frame 10.

The power unit is mounted on the frame by two mounting means or mountings indicated at 31 and 32 respectively and lateral locating means 33. These means are located at the apices of a triangle lying in a plane perpendicular to the rotary axis 26 of the driving wheel 25. The lateral locating means 33 is connected to the power unit through a rigid link 34 which is at its lower end rigidly connected to the power unit. By the use of such a link, both of the means 31 and 33 can be anchored to the backbone 11 while the mounting means 32 is anchored to the frame adjacent to the junctions 20 so that each of the three means is rigidly located relative to the other two means on the rigid frame and it will be seen that no bent tubes are used to locate or support the engine as is described in said U.S. Pat. No. 3,542,146.

The construction of the means 31, 32 and 33 will now be described.

Figure 2:
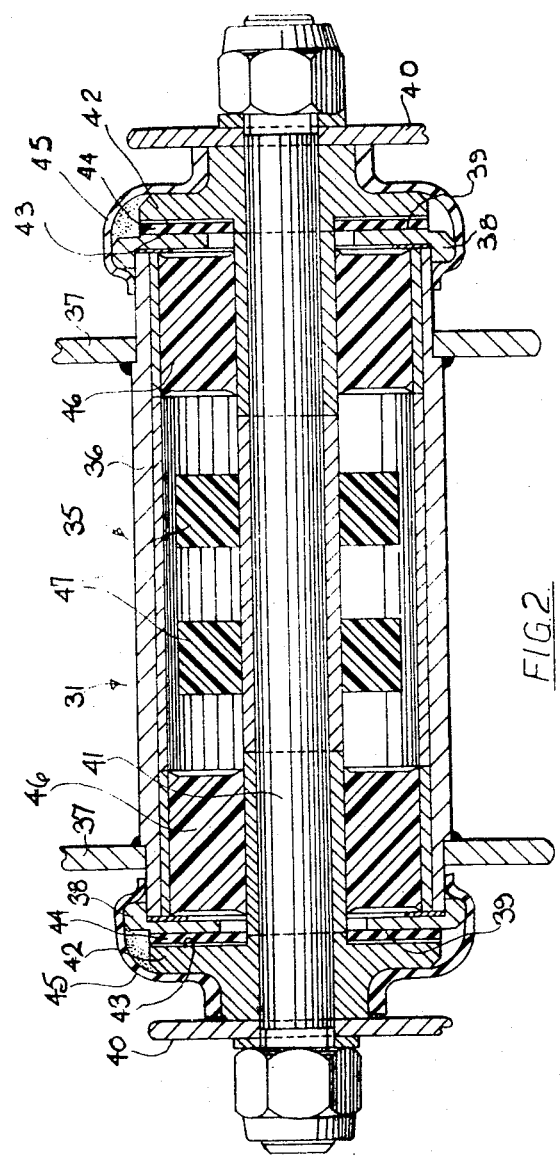
FIG. 2 is a cross-section through a first form of mounting for the power unit of the motor cycle of FIG. 1.

Referring now to FIG. 2, this shows the mounting 31. It comprises an element in the form of a tubular assembly 35 comprising a mounting sleeve 36 which is welded to plates 37 which in turn are welded to the backbone 11. At each end, the mounting sleeve 35 carries thrust plates 38 which provide outwardly directed faces 39.

A bracket is secured to the cylinder block 22 and comprises two plates 40 between which is secured a shaft 41. The shaft 41 carries thrust plates 42 and these thrust plates provide inwardly directed surfaces 43. Between each pair of surfaces 39 and 43 is interposed a washer of bearing material 44. Seals 45 seal the ends of the tubular assembly.

Bushes 46 of resilient material are interposed between the shaft 41 and the tubular assembly 36 and each bush of resilient material is bonded to inner and outer metal sleeves which engage the shaft 41 and mounting sleeve 36 respectively. Two further resilient bushes 47 are provided surrounding the shaft of lesser diameter than the bushes 46. It will be noted that the longitudinal axis of the shaft 41 is parallel to the rotary axis 26 of the driving wheel 25.

The lateral locating means 33 is similar to the mounting 31 except that it is shorter and does not have the resilient bushes such as 46 and 47. Thus the means 33 comprises plates 48 which are welded to the backbone 11 and which carry a mounting sleeve 49 forming part of a tubular assembly 50. The tubular assembly also includes thrust plates 51 which have outwardly directed surfaces 52. The link 34 comprises spaced lugs 53 between which extends a shaft 54 carrying nuts 55 at its ends. The shaft 54 carries thrust plates 56 and these thrust plates provide inwardly directed faces 57. Between each pair of faces 52 and 57 is a washer 58 of bearing material. Seals 59 seal the ends of the means.

The mounting 32 is in all respects similar to the mounting 31 and is interposed between the power unit and the junctions 20 of the tubes 15 and 18.

Movement of the power unit in the frame in directions perpendicular to the rotary axis 26 is controlled by compression of the resilient bushes 46 in the mountings 31 and 32 and, under extreme deflections, by the compression of the bushes 47. Movement of the power unit 21 parallel to the rotary axis 26 is controlled by the clearance between each pair of opposed faces on the means such as 39 and 43 for the mountings 31 and 32 and the faces 52 and 57 for the lateral locating means 33 and the washer 44 or 58 of bearing material between each opposed pair of faces. The movement of the power unit relative to the frame in directions parallel to the axis 26 is thus limited positively by the engagement of the faces of each opposed pair with the washer of bearing material between the faces of the pair. This positive limitation on movement of the power unit parallel to the axis 26, therefore, locates the power unit positively in this direction. The amplitude of the permitted movement of the power unit in directions parallel to the axis 26 is a number of times less than the amplitude of the permitted movement in directions perpendicular to the axis, such movements perpendicular to the axis being controlled by the compression of the resilient bushes 46 and 47. In other words, the power unit can oscillate substantially in planes perpendicular to the axis 26 with a relatively high amplitude and this does not affect the handling characteristics of the motor cycle but the power unit has a relatively lower permitted amplitude of movement in directions parallel to the axis 26 since such movement does adversely affect the handling characteristics of the motor cycle due to the fact that the driving wheel 25 is mounted on the power unit 21.

Figure 4:
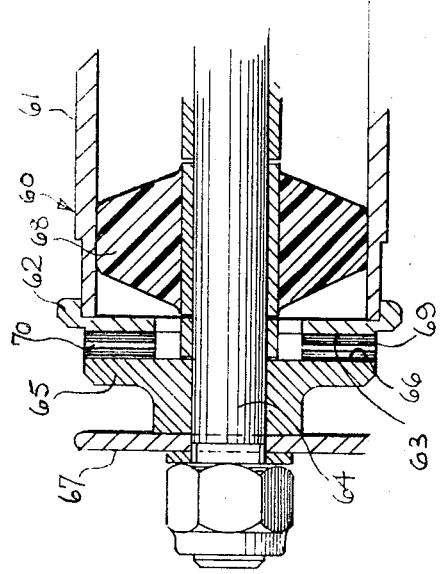
FIG. 4 is a partial section through a second type of mounting unit for the motor cycle of FIG. 1.

Referring now to FIG. 4 this shows in part a modification of the mounting 31. The modified mounting comprises a tubular assembly indicated generally at 60 and comprising a mounting sleeve 61 which at its ends carries thrust plates 62, the thrust plates providing outwardly directed surfaces 63. A shaft 64 passes through the tubular assembly and carries thrust plates 65 having inwardly directed surfaces 66. The shaft is secured to the frame or power unit through plates 67 and the mounting sleeve 61 is secured to the other of the frame or the power unit through mounting plates not shown. The shaft 64 carries resilient bushes 68 which operate in the same manner as the bushes 46 in FIG. 2. Interposed between each pair of faces 63 and 66 there is a block of resilient polyurethane material 69 which had been compressed between the faces 63 and 69 so that it is substantially solid in directions perpendicular to said faces thus positively locating the tubular assembly 60 and the shaft 64 relative to one another in directions parallel to the longitudinal axis of the shaft 64 i.e. parallel to the rotary axis 26 of the rear road wheel. The block of material 69 has a plurality of radially directed holes 70 therein. It is known that when a resilient material is compressed strongly in one direction then the capacity of the material to resist shear stresses in a perpendicular direction is reduced. Thus the blocks 69 have the property of limiting virtually positively the endwise movement of the shaft 64 relative to the mounting sleeve 61 while allowing relative movement of the shaft 64 within the sleeve 61 in radial directions. The resulting structure therefore functions substantially as does the structure of the mounting 31.

Figure 3:
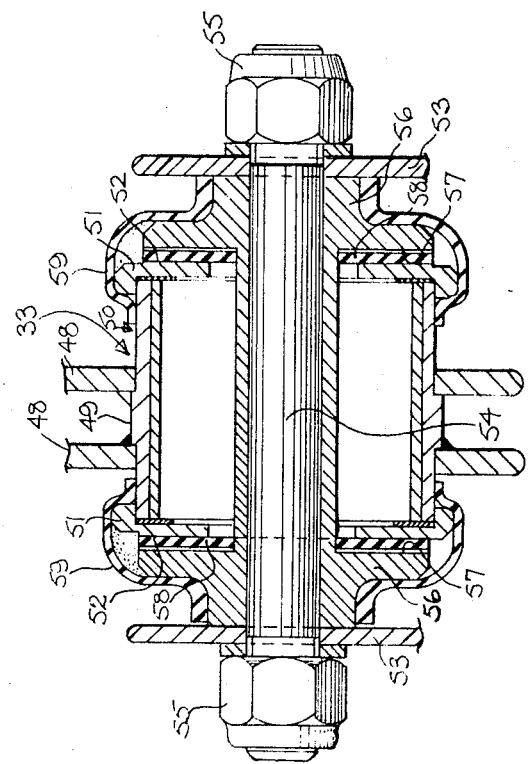
FIG. 3 is a section through a lateral locating means for a power unit of the motor cycle of FIG. 1.

The mountings 31 and 32 may be replaced with mountings modified as described in relation to FIG. 4 and the lateral locating means 33 may be as described in relation to FIG. 3 except that blocks of resilient material such as 69 take the place of the washers 58.

Figure 5:
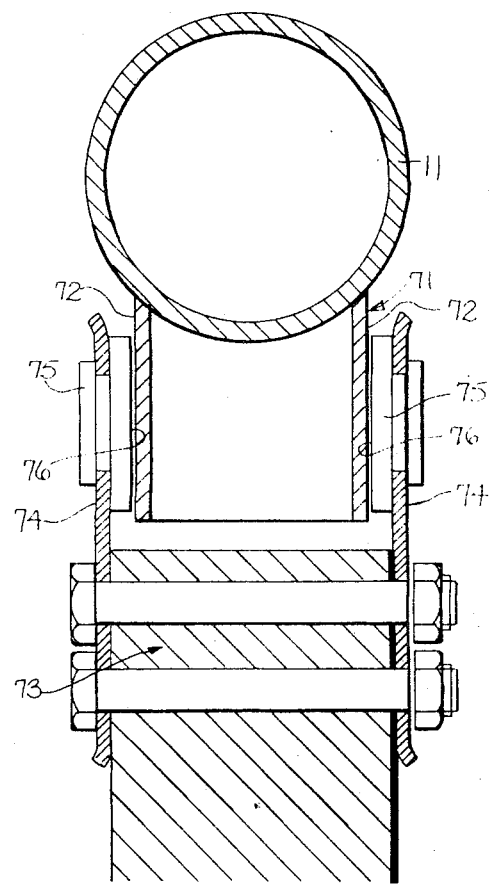
FIG. 5 is a sectional view through a second type of lateral locating means for the power unit of the motor cycle of FIG. 1.

FIG. 5 illustrates a modification of the lateral locating means 33 and, referring to that Figure, the backbone 11 carries a bracket 71 having parallel faces 72. The upper end of a link similar to the link 34 is indicated at 73 and bolted to the end of the link are plates 74 which carry pads 75 of nylon or similar material having faces 76 which are parallel to, and slightly spaced from, the faces 72.

It will be seen that the lateral locating means of FIG. 5 controls movement of the power unit in directions parallel to the axis 26 without restraining movement in directions perpendicular to the axis.

FIG. 6 shows a motor cycle similar to that of FIG. 1 except that in place of the triangulated frame 10 there is a sheet metal frame indicated generally at 77. Thus this frame carries front forks 78 with the front road wheel 79 and also the power unit 80 which in turn carries the rear road wheel 81 through a pivoted fork 82, the wheel being driven by a chain 83. The power unit 80 is mounted on the frame by two mounting 84 and 85 and lateral locating means 86. The mountings 84 and 85 are of the construction described in relation to FIG. 2 and the lateral locating means 86 is of the construction described in relation to FIG. 3. A link 87 extends from the means 86 and is rigidly secured to the power unit 80.

The frame is generally of box construction, having an upper part 88, side plates 89 and front and rear plates 90 and 91. It will thus be seen that the frame is substantially in the form of a box girder and the link 87 passes into the box girder frame and is secured to a bracket 92 provided therein. Since the frame is of box girder construction, the points at which the means 84, 85 and 86 are secured are rigidly interconnected and therefore cannot move relative to one another even in extreme stress so that even with a very high speed racing motor cycle the attachment points of the means 84, 85 and 86 to the frame do not move relative to one another under stress and thus the handling of the motor cycle is improved.

We have found that by positively limiting the movement of the power unit relative to the frame in directions parallel to the axis 26 at all three means, very advantageous results are obtained and that these results are improved further where, as is preferred, the mountings are located on a triangulated tubular frame as described in FIG. 1 or a box section sheet metal frame as described in relation to FIG. 5 and the means are prevented from moving relative to one another under the extreme stresses which occur during the operation of high speed racing motor cycles.

The invention has been specifically described in relation to motor cycles but it may also be applied to other two wheeled steerable vehicles and the engine mounting systems described could also be applied to snowmobiles in which case the driven wheel 81 would drive the track of the snowmobile.

I claim:

1. A vehicle comprising: a frame, a power unit movably mounted on the frame but having a neutral position relative thereto; a fork pivotally mounted on the power unit; a driving wheel rotatably mounted in the fork; a driving loop interconnecting the driving wheel and the power unit; and means for mounting the power unit to the frame comprising two mounting means and one lateral locating means interposed between the power unit and the frame; said means for mounting being located respectively at the apices of a triangle lying in a plane perpendicular to the axis of rotation of the driving wheel, each of said means for mounting comprising a first rigid mounting element fixed to one of the power unit and the frame, a second rigid mounting element fixed to the other of the power unit and the frame, each of said mounting elements providing two oppositely directed faces, said faces of said mounting elements of each of said means for mounting being arranged in two pairs, each said pair comprising one said face from each said mounting element with said faces of each said pair facing one another, and a thrust member of bearing material interposed between said faces of each said pair; each of said mounting means including a mass of resilient material interposed between said mounting elements thereof and located so as to provide substantially the sole support for the weight of the power unit and so as to control movement of the power unit relative to the frame in first directions radial to said axis of rotation by deformation of the resilient material; each of said means for mounting positively controlling said movement in second directions parallel to said axis of rotation by engagement between said faces and said thrust members which are substantially incompressible in said second directions, the permitted amplitude of said movement in said first directions being a number of times greater than the permitted amplitude of said movement in said second directions, said lateral locating means being at an upper apex of said triangle and serving to control said movement of the power unit solely in said second directions.

2. A vehicle according to claim 1 wherein said first rigid mounting element of each of said mounting means is in the form of a tubular assembly having said oppositely directed faces at the ends thereof; wherein said second rigid mounting element of each of said mounting means is in the form of a shaft passing through said tubular assembly and carrying abutment plates at the ends thereof; which plates provide said oppositely directed faces of the second rigid mounting element, and wherein the mass of resilient material of each said mounting means is in the form of bush means within the tubular assembly and surrounding the shaft.

3. A vehicle according to claim 2 wherein each said thrust member of each of said two mounting means is received with clearance between the faces of each said pair of said faces of said mounting means.

4. A vehicle according to claim 2 wherein each said thrust member of each of said two mounting means comprises a block of resilient material compressed between each said pair of said faces of said mounting means in directions parallel to the longitudinal axis of the tubular assembly, the resilient material of said block being compressed to such an extent as positively to limit movement of the power unit relative to the frame in said second directions.

5. A vehicle according to claim 2 wherein said first rigid mounting element of said lateral locating means is in the form of a tubular assembly having said oppositely directed faces at the ends thereof; and wherein the second rigid mounting element of said lateral locating means is in the form of a shaft passing freely through said tubular assembly with clearance and carrying abutment plates at the ends thereof, which plates provide said oppositely directed faces of said second rigid mounting element.

6. A vehicle according to claim 5 wherein each said thrust member of said lateral locating means comprises a block of resilient material compressed between each said pair of said faces of said lateral locating means in a direction parallel to the longitudinal axis of the tubular assembly, the resilient material of the block being compressed to such extent as positively to limit movement of the power unit relative to the frame in said second directions.

7. A vehicle according to claim 5 wherein each said thrust member of said lateral locating means is received with clearance between the faces of each said pair of said faces of said lateral locating means.

8. A vehicle according to claim 2 wherein said rigid mounting elements of said lateral locating means are both of U-shape, the limbs of the U of one said rigid mounting element being parallel to the limbs of the U of the other said rigid mounting element, said limbs providing said faces of said rigid mounting elements between which said bearing material is interposed.

9. A vehicle according to claim 1 wherein the frame includes a straight tubular backbone having front and rear ends, first and second transversely extending rigid attachment means secured to said backbone adjacent its rear end and intermediate its ends respectively, said rigid attachment means projecting on both sides of said backbone, a first pair of spaced-apart substantially parallel tubes extending generally downwardly from, and secured to, said first rigid attachment means and a second pair of spaced-apart substantially parallel tubes inclined relative to said backbone and extending rearwardly from, and secured to, said second rigid attachment means, said tubes of each said pair being arranged one on either side of said backbone, said tubes lying to one side of the backbone being joined and said tubes lying to the other side of the backbone being joined, all said tubes being straight between their junctions and said rigid attachment means, one said mounting element of each of said means for mounting being secured to the frame, said one mounting element of one of said means for mounting being secured to the backbone, and said one mounting element of one of said two mounting means being secured to the frame adjacent to the tube junctions.

10. A vehicle according to claim 9 wherein said one mounting element of the lateral locating means is secured to the backbone and said other mounting element of said lateral locating means is connected to a link rigidly secured to the power unit.

11. A vehicle according to claim 1 wherein the vehicle comprises a rigid sheet metal frame and one of said mounting elements of each of said means for mounting is secured to a different part of the frame, which parts are rigidly interconnected by the frame.

12. A vehicle according to claim 11 wherein one of said mounting elements of said lateral locating means is secured to a rigid link rigidly connected to the power unit.

* * * * *